Sept. 8, 1970    W. H. PETERSON    3,527,935
VEHICLE SPEED CONTROL DEVICE
Filed Dec. 29, 1967    4 Sheets-Sheet 1
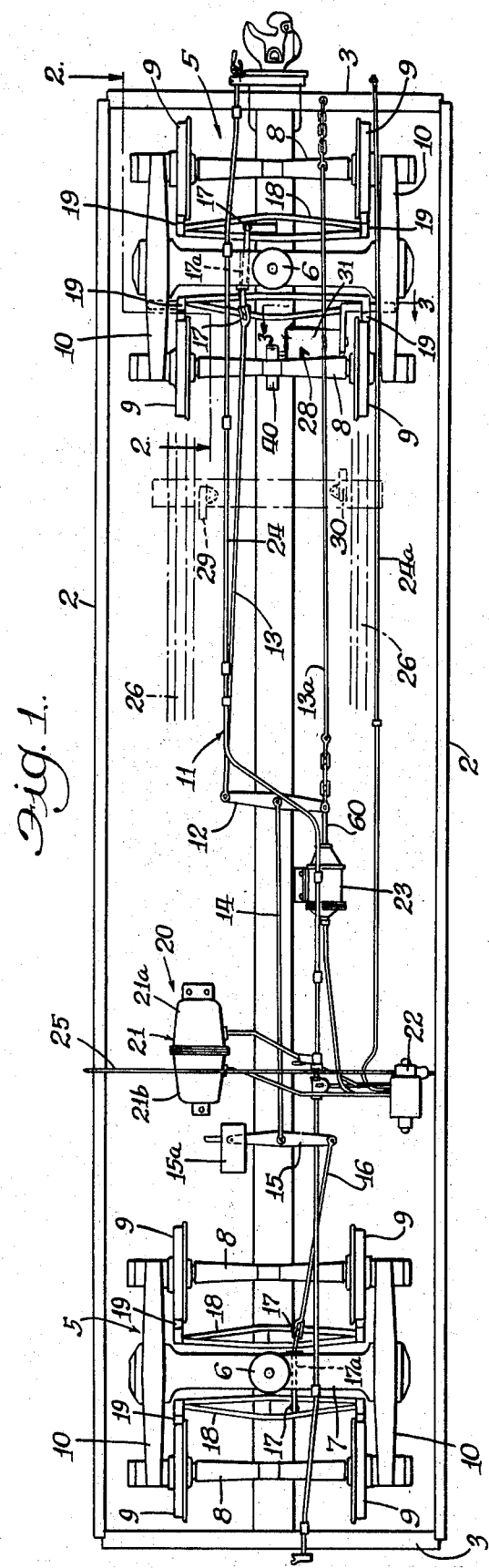
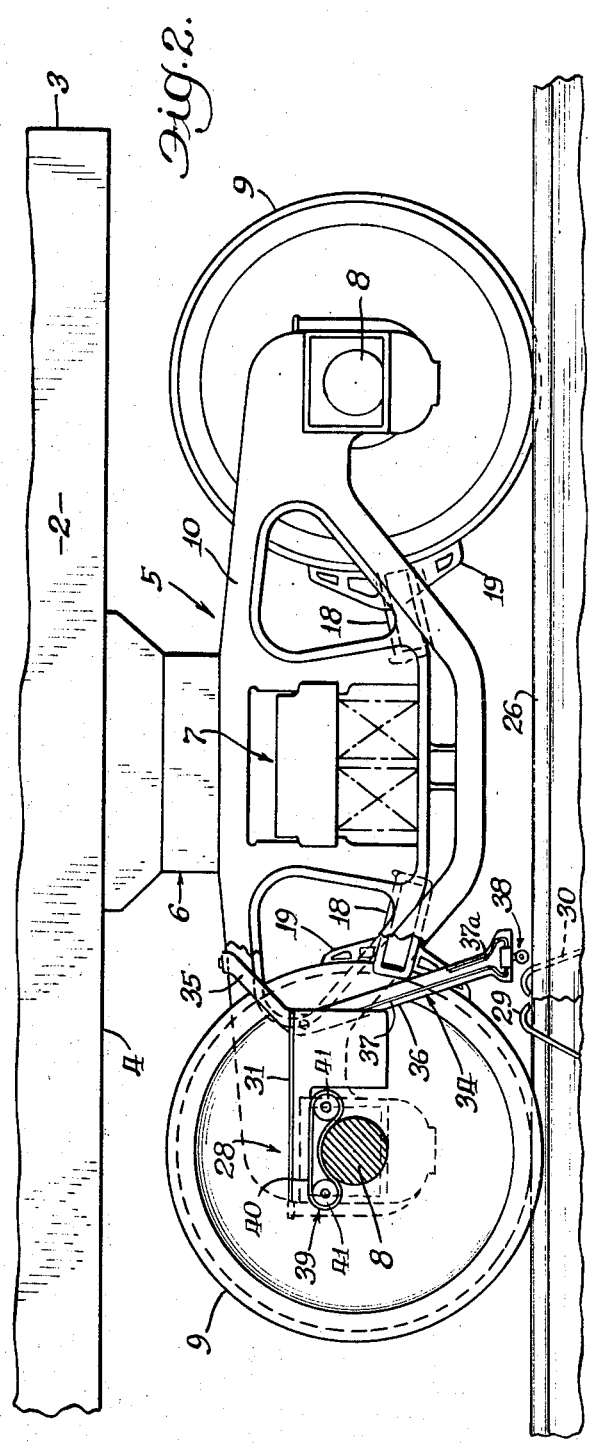
Inventor:
William H. Peterson
By: Richard J. Myers
Atty.

Sept. 8, 1970

W. H. PETERSON 3,527,935

VEHICLE SPEED CONTROL DEVICE

Filed Dec. 29, 1967

Inventor:
William H. Peterson

By Richard J. Myers
Atty.

Inventor
William H. Peterson
By: Richard J. Myers
Atty

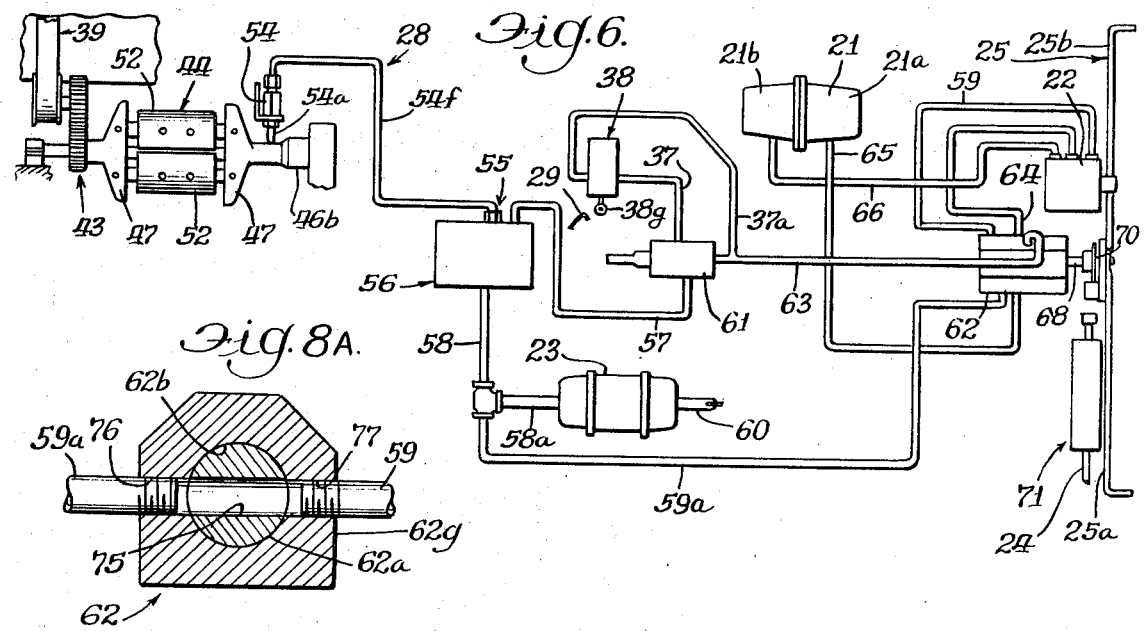
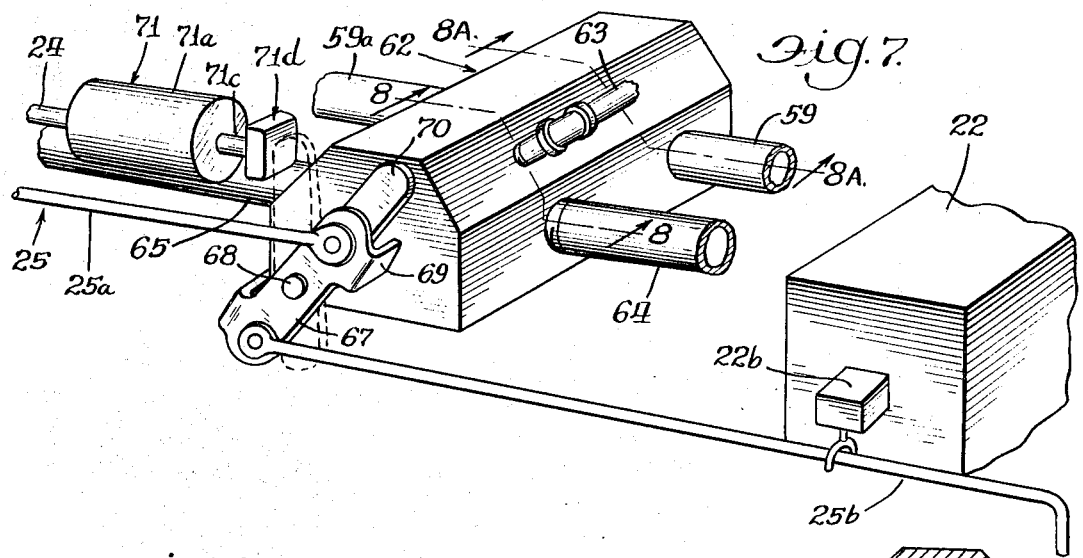
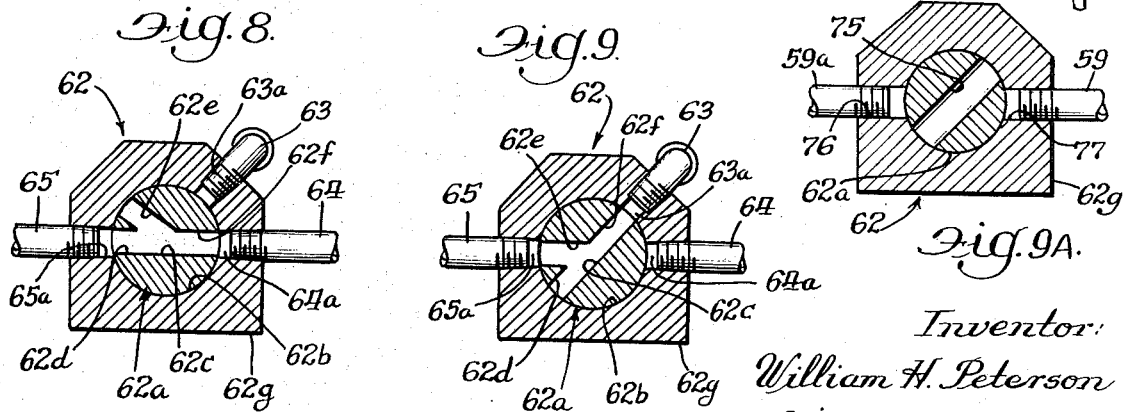

United States Patent Office 3,527,935
Patented Sept. 8, 1970

3,527,935
VEHICLE SPEED CONTROL DEVICE
William H. Peterson, Homewood, Ill., assignor to Pullman Incorporated, Chicago, Ill., a corporation of Delaware
Filed Dec. 29, 1967, Ser. No. 694,435
Int. Cl. B61l 3/04
U.S. Cl. 246—182         29 Claims

ABSTRACT OF THE DISCLOSURE

A railroad car comprising a body and an underframe, truck means supporting the underframe, and car speed control means mounted on said truck means, a railroad car brake system comprising pneumatic means operable to apply brakes to said truck means, the speed control means having a speed responsive device in the form of a speed sensing belt drivingly engaging with the truck axle and operating centrifugal weights which fly out a proportional distance to operate a pre-conditioned valve for supplying pneumatic pressure from the pneumatic means to the brakes, and pre-conditioning pneumatic valve means including an on-ground valve tripping device tripped by passage of the car over it and opening the pre-conditioning valve means to allow pneumatic pressure to said first mentioned valve and thereby conditioning the latter. The railroad car is further provided with manually operated mechanical linkage for isolating the pneumatic means from the car brakes and communicating the pneumatic means with the first mentioned valve of the speed control device.

CROSS-REFERENCES TO RELATED APPLICATIONS

This application is related to my co-pending patent applications having Docket Nos. 67176 and 66225, respective Ser. Nos. 694,447 and 694,705 filed on the date of the subject application.

BACKGROUND OF THE INVENTION

Field of invention

This invention relates to means for controlling the speed of a railroad car and in particular relates to means for regulating the speed of a car in the classification yards where the car is to be coupled with other cars to make a train. The invention finds its particular use in the switching yards containing freight cars where one freight car must be coupled to one or more freight cars which are standing still and where it is desired to reduce the coupling impact between the moving and non-moving freight car. It is desirable to control the speed of the moving freight car to about a maximum of four miles per hour in order to reduce damage to lading resulting from impact between the coupling freight vehicles.

Description of the prior art

In the classification yard of a railroad company there is provided a system for coupling of freight cars together to make up a train. The freight car to be coupled is given a certain amount of speed either by rolling down an incline or by being shoved by some other means and the speed of the moving car is on occasion regulated by going over a hump so that as the vehicle leaves the hump an exiting speed is obtained. The vehicle at this speed then travels to a ladder track in accordance with the operations of the conventional switching arrangements within the yards to allow the freight car to couple with its specific train arrangement in a ladder track. There ladder tracks are provided with retarding means which allow the railroad car to be slowed down and are in the form of brake means that are ground mounted and extend toward the wheels of the truck and frictionally engage the truck wheels to slow down the car. However, the yards do not provide for anything that is mounted on the freight car itself to slow down the speed of the freight car which this invention has for its purpose to provide. The prior art provides various types of signalling devices such as radar devices or sonar devices or the like which rely on sound, light or electromagnetic waves to sense the presence of cars ahead of the moving vehicle and so that coupling occurs at a safe speed, thereby operate equipment to retard vehicle movement. However, such types of equipment have disadvantages, one being that as the moving vehicle moves around a curve it loses contact with the vehicle it intends to couple with and also sensing is affected by the presence of other vehicles with which the moving car does not intend to couple. The art further shows means for slowing down the vehicle when it exceeds a certain speed wherein such retarding means is mounted on the vehicle. These latter types of devices are of the mechanical type that measure the rotation of the truck wheels and are repsonsible thereto to operate the usual hand to brake linkage of the railroad car. However, nothing is provided to control the speed of the vehicle by utilization of the novel combination of speed sensing and governing means including novel valving cooperative with the normal brake system, namely, the pneumatic or air brake system found on the railroad car. Further, the prior art does not provide for means to condition braking of the railroad car to be braked beyond a certain predetermined speed in the yards and yet when the railroad car is out of the yards, the car will not be so braked if such certain speed is exceeded. It is these problems that are solved by the applicant's invention.

SUMMARY

The invention has for its purposes, objectives, and advantages the provision of a freight car mounted braking system that is responsive to speeds of the freight vehicle when conditioned in predetermined areas to apply the normal on-vehicle pneumatic brakes when the vehicle is in excess of a predetermined speed such as where the speed of the vehicle should be in excess of three to four miles an hour and is reduced so that upon impact with a stationary vehicle in the freight yard damage to the lading on either vehicle is substantially reduced or eliminated. It is a further object of this invention to provide for a speed responsive device in the form of a fly weight governor device mechanically and frictionally engageable with the truck axle and responsive to the speed of the truck axle whereby the governor weights fly out in proportion to the speed to operate novel valving for conducting air pressure from a source on the vehicle to the vehicle air brake cylinder for operating the vehicle brakes. Further the invention provides for the use of an on-track-mounted tripping mechanism to condition valving allowing the supply of pneumatic pressure from the air brake system to be readily available for vehicle should it exceed a certain speed and require operation of the air brake system. The invention comprehends the application of brakes only during the time the vehicle speed is in excess of a predetermined speed but if the speed is less, then application of the brakes is removed. Further there is provided mechanical means for operating additional valve means to close the air brakes off from the source of brake pressure and to expose the air brakes to the source of brake pressure where switching operations are being performed. These and other objects, advantages and purposes will be apparent from reference to the following description and appended claims and attached drawings.

3

BRIEF DESCRIPTION OF THE DRAWINGS

FIG. 1 is an underside or bottom plan view of a box car showing the existing brake rigging and the adaptation of this invention to it for controlling impact speeds at low levels;

FIG. 2 is a partial sectional view taken along line 2—2 of FIG. 1;

FIG. 6 is a schematic view of the pneumatic conduit and mechanical linkage of the brake system;

FIG. 7 is a partial view of FIG. 6 illustrating the construction of the reservoir isolating valve and environs;

FIG. 8 is a sectional view of the reservoir isolating valve in the position it would be in when the car is operating in a train with air pressure in the train line and in this position, the normal pneumatic conduits of the brake system is obtained;

FIG. 8A is a sectional view taken along line 8A—8A of FIG. 7 showing the reservoir isolating valve in the position shown in FIG. 8;

FIG. 9 is a view similar to FIG. 8 but with the reservoir isolating valve in the position in which the pneumatic conduits of the emergency reservoir and brake cylinder are isolated from the normal system, making these elements exclusively available to function as a speed retarding arrangement during switching operations; and FIG. 9A is a view similar to FIG. 8A but showing the reservoir isolating valve in the position shown in FIG. 9.

DESCRIPTION OF THE PREFERRED EMBODIMENT

Figure 3:
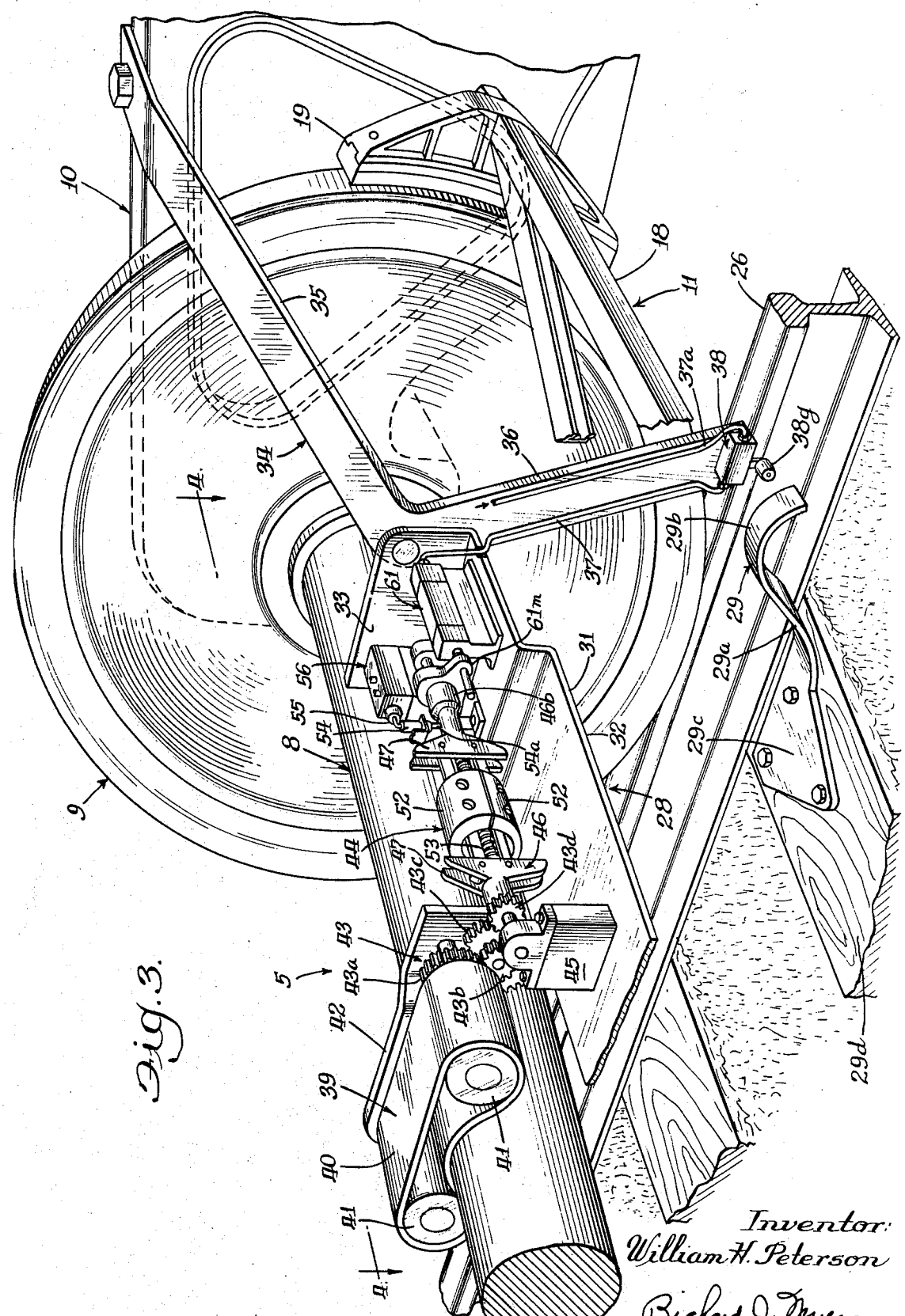
FIG. 3 is a view of the arrangement of the various components of the speed control elements taken along line 3—3 of FIG. 1.

With reference to the drawings and in particular with reference to FIGS. 1 and 2 there is shown a railroad box car 1 which is provided with sides 2, 2 and ends 3, 3 and an underframe 4 supported by truck assemblies 5, 5 each of which comprise the usual truck center plate structure 6, the truck bolster 7, the truck axles 8, 8 each of which have truck wheels 9, 9 and truck side frames 10, 10. The underside or underframe of the car is further provided with brake rigging 11 including cylinder lever 12, connecting rods 13 and 14 and hand brake rod 13a, as well as dead lever 15 and fulcrum 15a and the connecting rod 16, brake levers 17, tie rods 17a, brake beams 18, 18 for each truck assembly and brake shoes 19, 19 for each beam 18. The rigging 11 operates the conventional air brake system 20 including the combined auxiliary and emergency reservoir 21 and the conventional air brake valve or AB valve 22, brake cylinder 23 and brake piping or trainline 24 and brake release rod 25. The railroad box car 1 operates over the rails 26, 26.

Each card is provided with the novel and inventive truck mounted speed control device 28 and the novel between-the-rail, ground-mounted speed control device trip mechanisms 29 and 30. The trip mechanism 29 which is similar to the mechanism 30 comprises an upwardly curved member which, as seen in FIGS. 2 and 3, is provided with a rise portion 29a and a top curved end portion 29b, a base tie mounted portion 29c mounted on a tie 29d between the rails. The mechanisms 29 and 30 are located in the path of the wheel flanges since this is always clear of any debris which might otherwise falsely activate the device. The truck-mounted speed control device 28 comprises an outer housing 31, as seen in FIG. 3, including base plate 32 and side wall 33 (see FIG. 3) held by an upright bracket 34 including an upper arm 35 attached to the upper end of the side frame 10 and a lower arm 36 which carries the air line 37 which supplies air pressure to shift supply valve 61 to the open

4 position activating the speed control arrangement, the poppet trip valve means 38 and the air line 37a which carries air pressure from the reservoir isolating valve.

Figure 4:
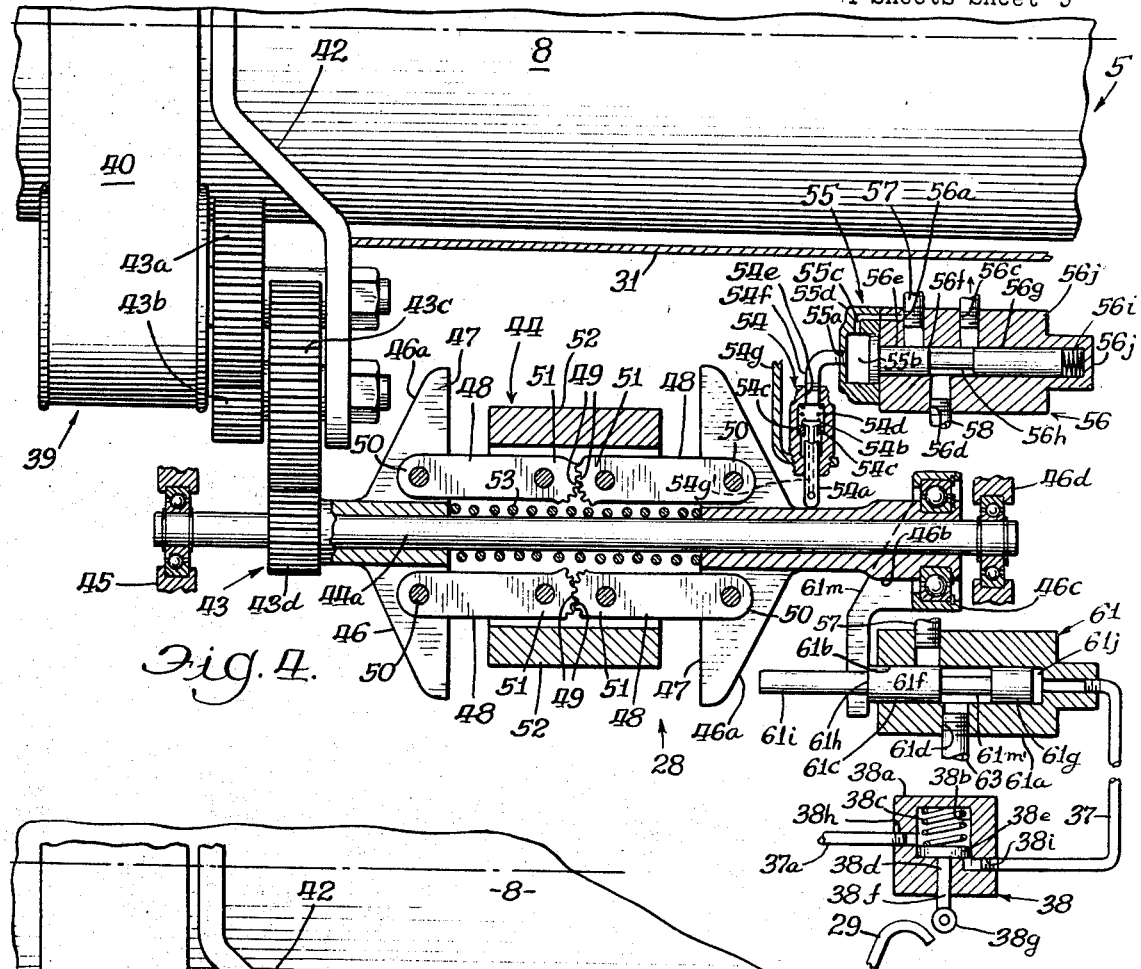
FIG. 4 is a partial sectional view taken along line 4—4 of FIG. 3.

The poppet trip valve means 38 which is operated by engagement with the trip arm 29 comprises a valve body 38a as seen in FIG. 4, having a chamber 38b provided with a spring 38c and a plunger 38d having a head 38e and a stem 38f which is provided with an end roller 38g with the valve body having chamber inlet 38h and outlet 38i. The roller engages the leading edge of the trip 29 as the car moves toward the trip 29 resulting in depressing of the roller 38g to force the plunger 38d against the spring 38c resulting in letting the air lines 37a communicate with the air line 37 to momentarily supply air under pressure to the right end of supply valve means 61.

The speed control device 28, in addition to the poppet trip valve means 38 and the supply valve means 61, comprises a friction drive belt unti 39 comprising a belt 40 and a pair of belt stretching rollers 41 to allow the belt to engage the axle 8 of the truck assembly 5. The friction drive belt unit 39 further comprises an upright bracket 42 which carries one of the rollers 41 (right one) as viewed in FIGS. 3–5 and carries gear 43a (of gear assembly 43) concentric with that roller 41. The gear 43a drives through its reduction gear assembly 43b and 43c the spindle mounted gear 43d on governor shaft 44a of the fly weight governor arrrangement 44 which is supported by the journals 45 and 46d. The governor arrangement 44 has a governor spindle means 46 mounted on the shaft 44a. The governor spindle means 46 comprises a pair of spaced apart governor spindles or sleeves 47, 47, each having a governor spindle flange means (a pair of flange plates) 46a. The right sleeve 47 has a brake activating means in the form of sleeve 47 has a brake activating means in the form of raised left end part or abutment 46b carried in the bearing 46c (see FIGS. 4 and 5). As viewed in FIG. 4, the left spindle 47 is rotated by the gearing 43 but it is not allowed to move linearly on shaft 44a; whereas the right governor spindle 47 is allowed not only to rotate about the governor shaft 44 due to pivot connection with the right spindle 47 but is also allowed to reciprocate in a linear direction by action of fly weights to permit the raised end 46b of left sprindle 47 thereof to cooperate with valve means to be later explained. Each of the governor radial flanges 46a carry a pair of levers 48 having their ends pivotally connected to the radial flange at 50 and having their other ends 51, 51 pivotally connected to a pair of opposed radial spaced governor fly weights 52, 52. The fly weights 52, 52 each are semi-cylindrical in shape and cooperate with each other in closed position to form a cylinder. The tips 49, 49 of the pivot ends 51, 51 of the levers 48, 48 of each flange or arm 47 are notched or serrated to form toothed tips which mesh with one another to provide for smooth inward and outward movement of the semi-cylindrical fly weights 52, 52 preventing skewing thereof. The shaft 44a carries a spring 53 thereabout between each spindle 47. The spring 53 biasingly urges the right governor spindle 47 away from the left governor spindle.

Figure 5:
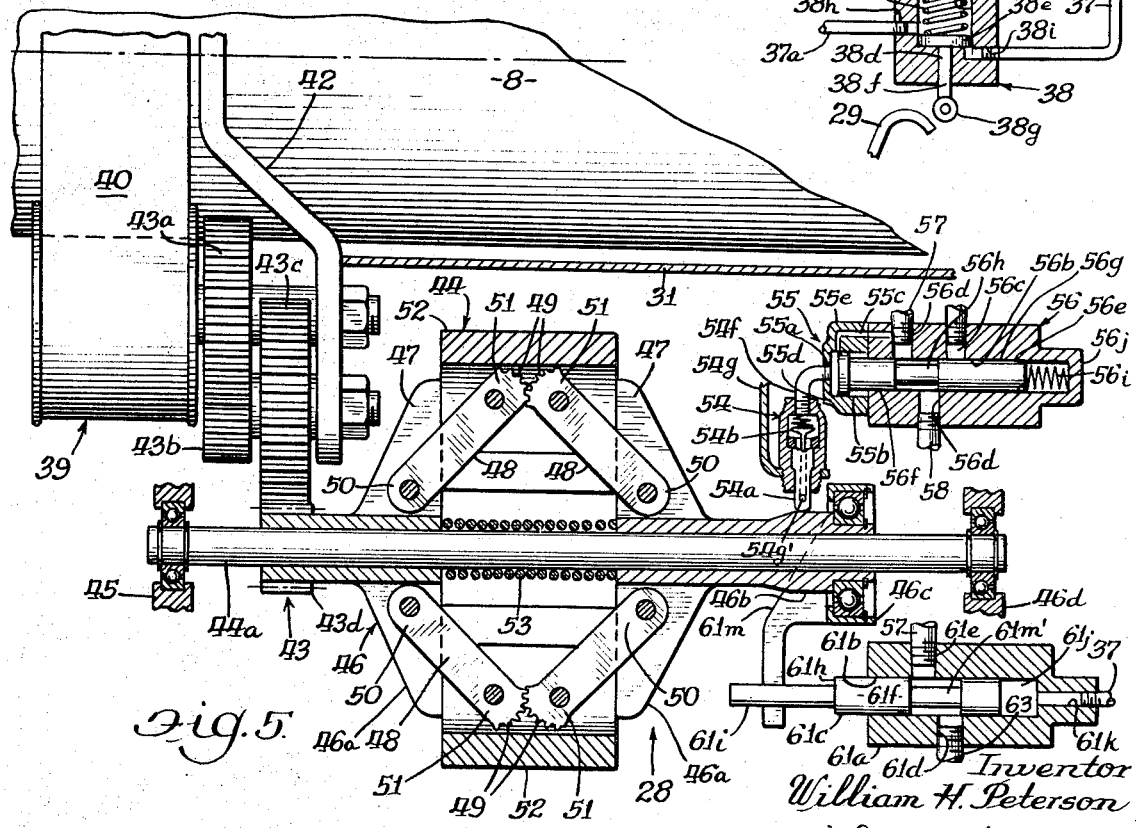
FIG. 5 is a view similar to FIG. 4 but with the weights of the governor being outward in response to increased vehicle speed.

As seen in FIGS. 3, 4 and 5 there is provided a bleed valve arrangement 54 that cooperates with the raised end 46b of the right governor spindle sleeve 47. The bleed valve means 54 is provided with a plunger end 54a which is engageable with raised end 46b. The plunger end 54a is further provided with an inner valve element portion 54b engageable with a valve seat 54c. The unseating movement of the plunger end 54a of the valve element against a valve spring 54d allows for communication between valve passages 54e and valve pilot cylinder outlet line 54f and valve bleed line 54g' to the outside. The bleed valve 54 communicates by way of line 54f with the bleed pilot 55 of valve means 56. Pilot 55 comprises exhaust line 55a and a chamber 55b and a passage 55c (to inlet 56a) and a port 55d and a plunger end element 55e in a chamber 55b (see FIG. 5). Valve 54 is held by bracket 54g. A speed control valve 56 is provided adjacent the bleed pilot means 55 and comprises an inlet portion 56a, a valve bore or chamber 56b and a valve outlet 56c to exhaust (to atmosphere) and a valve outlet 56d to the brake cylinder 23. The valves 54 and 56 and the pilot valve 55 comprise the brake actuating means. Valve means 56 has a spool 56e provided with lands 56f and 56g reciprocal in the bore or chamber 56b and defines the grooves 56h between the lands. A spring 56i is located at the right hand of the spool 56e which is located in the valve body 56j. Speed control valve outlet 56d communicates with a speed control valve outlet line 58 to the brake cylinder by way of brake line 58a which also communicates with reservoir isolating valve 62 which communicates with brake line 59 which leads to AB valve 22. As seen in FIG. 1, the brake cylinder 23 is provided with brake cylinder piston rod 60 which connects with a cylinder lever 12 and with a hand brake rod 13a.

The supply valve 61 along with the speed control valve 56, the bleed pilot 55 and the bleed valve 54 form part of the pneumatic valve arrangement that cooperates with the mechanical components such as fly weights 52 and governor spindle 47, gearing 43 and the belt drive unit 39 to form the novel speed control unit 28. The supply valve 61 is pilot operated from the poppet trip valve 38 which with the valve 61 comprises conditioning means to operate the speed control device and the valve 61 comprises a valve body 61a and having a bore 61b in which is disposed spool 61c having spool lands 61f and 61g. The valve body 61a is provided with an inlet 61d and an outlet 61e to line 57 to the speed control valve 56. The land 61f is provided with a shouldered end 61h connecting with an outside arm 61i. The right hand end of the body 61a (see FIGS. 4 and 5) comprises a chamber 61j as defined by the right end spool 61g and the bore 61d. A chamber 61j connects with the pilot inlet port 61k to line 37. With reference to FIGS. 4 and 5 it is seen that there is provided an arm 61m which is carried by the movable right hand spindle 47 adjacent the raised shoulder portion 46b thereof. The bore of arm 61m cooperates with and slides along the spool extension 61i of the supply valve arrangement 61 to move the shoulder portion 61h to the right as shown in FIG. 4 from the position shown in FIG. 5 to close off valve 61 from line 57 when the car has coupled and come to a halt and the governor spindle is fully extended. The spool 61c is provided with a spool groove 61m' between the spool lands 61f and 61g.

As seen in FIG. 6 a schematic of the speed control device is shown in its relation to the pneumatic brake system of the railroad car and in addition to the valve arrangements discussed above there is shown a reservoir isolating valve 62 disposed between the emergency portion 21a as distinguished from the auxiliary portion 21b of the conventional reservoir tank 21, the supply valve 61, and the conventional AB valve 22 and between the brake cylinder 23 and the AB valve 22. A function of the reservoir isolating valve 62 is to cut off communication between the reservoir tank and the AB valve and between the brake cylinder 23 and the AB valve 22 by operation of the brake release rod 25 and to place the emergency portion 21a of the reservoir tank 21 into communication with the speed control valve arrangement in a novel manner. Construction of the reservoir isolating valve 62 is more clearly depicted in FIGS. 7, 8, 8A, 9 and 9A and comprises a rotary valve spool 62a rotatable in bore 62b in body 62g. The rotary valve spool 62a has a Y-shaped passage 62c having branches 62d, 62e and 62f as seen in FIGS. 8 and 9. The air line 63 communicates reservoir isolating valve body port 63a with the supply valve 61. Air line 64 connects the AB valve 22 with valve body port 64a of the reservoir isolating valve 62. Air line 65 extends from the reservoir emergency portion 21a of tank 21 to the reservoir isolating valve 62. Air line 66 extends from the auxiliary part 21b of the reservoir tank 21 to the AB valve 22 and is not altered from the normal conventional arrangement. The valve spool 62a also has a passage 75 isolated from passage 62c and communicating with body passages 76 and 77 isolated from passages 65a and 64a and, as seen in FIG. 8A, communicating with lines 59 and 59a to the AB valve and brake cylinder and valve 61. The rotary valve 62a has an arm or extension lever in the form of a shaft 68 which rotatively supports the arm or lever 67 and is fixedly connected to the valve lever 70 so that the trip arm 69 of the arm or lever 67 can engage the valve lever 70 by movement of rod 25 to the left, as seen in FIG. 7, to cause the rotary valve 62a affixed therewith to rotate from the position shown in FIG. 7 or FIGS. 8 and 8A to the position shown in FIGS. 9 and 9A to isolate the AB valve, the brake cylinder and the reservoir 22 and allow air pressure from the tank 21 to go to the supply valve 61 with the valve lever 70 moved close to cylinder 71 as shown in dotted line in FIG. 8. It can be seen in FIG. 7 that the brake release rod 25 is composed of two rod or arm portions 25a and 25b enabling rotation of shaft 68 and the rotary valve 62a between the two positions shown in FIGS. 8 and 9. As the brake release rod is pulled manually, as is conventionally done to release brakes prior to switching cars, movement of the brake release rod section 25b also causes operation of the conventional duplex release valve 22b of the AB valve 22, when the car is separated from the train of cars as is standard operation on uncoupling of cars from a train. The Bellofram air cylinder structure 71, adjacent the valve 62 (see FIGS. 6 and 7), comprises a body 71a having a piston 71c and a piston head 71d. When air pressure is introduced into trainline 24 to the air cylinder 71a, piston head 71d hits the valve handle 70 and resets the position of the emergency reservoir isolating valve 62 so that once again the reservoir tank may supply air pressure to the AB valve 22 and not the supply valve means 61, as shown in FIG. 8, thus restoring the pneumatic circuits of the car brake system back to their normal arrangement. It will be appreciated other sources of air pressure may be employed instead of reservoir 22, such as a separate pressurized air tank.

OPERATION

When a railroad car is to be coupled to another car in the railroad yards, the railroad car may be sent over a hump to a ladder track and as it enters a ladder track it is intended to be rolling at about four miles per hour until it couples with another car. However, should the speed be in excess of four miles per hour the automatic speed control device 28 will come into play in the following manner. As the car passes into its respective side track or ladder track to which it was classified for coupling with cars already on the ladder track, the car runs over the mechanical trip arrangement 29. As previously explained, there are two such trips, the other of such being numbered 30, and they are opposite one another inside of the pair of rails 26. Each car is provided with one speed control device 28 such that no matter which end of the car is proceeding toward the ladder track, one of the mechanical trip structures 29 will trip the poppet trip valve arrangement 38. When the poppet trip valve means 38 has its roller means 38g engage the top portion 29b of the trip structure 29 the valve stem or plunger 38d moves inwardly to unseat the valve head 38e momentarily against the spring 38c to allow a momentary jet of pressurized air to pass from the line 37a to the line 37 and into the port 61k of the supply valve 61 and into the chamber 61j to cause the spool 61c to move to the left or open valve position (since fly weights in expansion keep collar or resetting means 61m away from spool shoulder 61h) as shown in FIG. 5. This allows the inlet 61d to communicate with the outlet 61e to the speed control valve 56, or that is to say that line 63 may now communicate with line 57 by way of supply valve 61 as seen in FIG. 6. FIG. 4, on the other hand, due to contraction of fly weights 52, 52 together shows the arm 61i after it has moved to the right or valve off position (due to collar 61m) causing blocking of communication between the inlet 61d and the outlet 61e by the valve lands 61f and consequently no air pressure can pass to the speed control valve 56. Once the spool 61c is moved to the left and air pressure is opened to the supply valve 56, the speed control device 28 is pre-conditioned to function upon undue increase in speed of the railroad car and it can continue to so function until the left governor spindle depending arm or collar 61m has moved the arm 61i and shoulder 61f to the right or off position whence the air pressure is cut off from the speed control device on the car. This prevents unwanted application of the vehicle brakes when the car exceeds the governed speed by the speed control device when the car is not moving down a ladder track, prior to impacting other cars. The tripping mechanism 29 is located forward of the standing railroad cars a necessary distance such that the speed of the moving car is slowed to four miles per hour so that it will couple with the other standing cars without doing damage to the lading in any of the cars whether moving or standing still.

As the car passes the tripping device 29, if the speed exceeds four miles an hour this is sensed by the governor mechanism for, as the rotation of the truck axle 8 increases, this increased speed is sent to the gearing 43 and to the governor spindle parts 47, 47 which are rotated rapidly and cause the governor fly weights 51, 51 to fly outwardly causing the right governor spindle 47 to be drawn to the left against the compressive action of the spring 53 to cause the outer plunger end 54a of the bleed valve 54 to ride up the enlarged end or protuberance 46b of the right handed spindle 47 as viewed in FIG. 5. In FIG. 4 the spindle portions 46a, 46a are widely separated whereas in FIG. 5 the spindles are drawn together and the weights are extended outwardly from one another as far as possible. The ends 54a of the bleed valve 54 is depressed in FIG. 5. This allows air pressure to escape from the bleed valve means 54 due to unseating of the valve element 54b so that pressurized air can escape from the bore 54e and the passage 54f and this causes a reduction in pressure in chamber 55b of the bleed pilot means 55 and the spring 56i of the speed control valve, now being of greater force, moves the spool 56e and the plunger 55e attached thereto to the left to allow air pressure from the supply valve means 61 to pass via line 57 through the speed control valve 56 and outline 58 to the line 58a to the brake cylinder 23 for applying the brake shoes 19 to the wheels 9 to slow the car 1 down to a speed below four miles per hour wherein the brake application is removed. The valve 56 is provided with the passage 55e that communicates with the valve inlet 56a and communicates with the chamber 55b of the bleed pilot 55, which normally supplies inlet air pressure to the chamber 55b to force the end plunger part 55e of the spool valve 56e to the right against the spring 56i at the other end of the valve 56. When the port 55a of the bleed pilot 55 is open to the atmosphere by the depressing of the tip 54a of the bleed valve 54, the pressure drops in the chamber 55b, allowing movement of the spool 56e and its end part 55e to the left as viewed in FIG. 4.

Lastly, it is to be appreciated that no air pressure can get to the line 63 leading to the supply valve means 61 and speed control valve means 56 unless the reservoir isolating valve 62 has been set by the brake release rod 25 to the position in FIG. 9 when there is zero pressure in the trainline or pipe 24. However, once the car has been coupled in the train and air pressure reintroduced into the trainline 24, the Bellofram air cylinder plunger 71c moves toward and engages with the valve handle 70 coupled to the brake release rod structure 25 causing resetting of the reservoir isolating valve 62, as shown in FIG. 8, restoring the brake pneumatic circuits to their normal arrangement.

When cars are uncoupled from a train for classification in a switch yard, the brake release rods are pulled on each car to release brakes so cars can be moved by the yard locomotive. In existing brake systems, pulling the release rod 25 all the way activates the duplex release valve which discharges all of the air pressure from both reservoirs and the entire brake system as well as releasing the brakes. With this invention, however, the pulling of the brake release rod 25 also rotates the rotary valve 62a so as to isolate the emergency reservoir 21a from the conventional brake air system so as to both retain and make the emergency air pressure available to the supply valve means 61. By isolating the emergency reservoir 21a, air cannot get back into the regular brake system because of leaking AB valves and cause the brakes to reapply. The view in FIG. 7 shows the reservoir isolating valve 62 after the car is detrained and prior to pulling the brake release rod. The Bellofram actuator 71 is retracted because there is no trainline pressure. Pulling the brake release rod 25 rotates the valve handle actuator 69 and the valve handle 70 to the position shown in FIG. 9, leaving the reservoir isolating valve 62 in this position as the valve handle actuator 69 returns to normal position upon releasing the brake release rod 25. The reservoir isolating valve 62 remains in this position making emergency reservoir air available to the supply valve means 61 until the car is again placed in a train and pressure built up in a trainline. As pressure builds up in the trainline 24, the Bellofram actuator 71 extends rotating the valve handle 70 back and reconnecting the emergency reservoir 21a to the brake system for normal operation as well as isolating it from the supply valve means 61.

The speed control means 28 is effective to limit the speed of the car 1 to about four miles per hour and the brakes of the car are applied only if such speed is exceeded. If the speed of the car is slightly less than say, four miles per hour, the governor spindle 47 moves slightly to the right and the bleed valve 54 closes since its stem 54a does not ride on the protuberance 46b of the governor spindle sleeve. This causes the spool 56h of speed control valve 56 to shift to the right in the position shown in FIG. 4 and the air pressure in the brake cylinder is exhausted, releasing the brakes. If the car should again attain a speed in excess of 4 m.p.h., the brakes are reapplied and again released as speeds drops to slightly less than 4 m.p.h. In this manner, car speed is controlled to no more than 4 m.p.h. but yet is free to roll at a safe speed down the ladder track until it couples. When its motion has stopped, the governor becomes fully extended, shutting off the supply valve as shown in FIG. 4 and the device is automatically reset for another triggering action at some future time when the car is again switched.

The foregoing description and drawings are given merely to explain and illustrate the invention, and the invention is not to be limited thereto, since those skilled in the art who have the disclosure before them will be able to make modifications and variations therein without departing from the scope of the invention.

What is claimed is:

1. Apparatus for controlling the speed of a vehicle comprising:
   vehicle mounted speed sensing means including ground driven means,
   governor means responsive to a predetermined maximum speed of the vehicle, said governor means connecting with said ground driven means and operated thereby attendant to limiting a maximum predetermined speed of the vehicle,
   vehicle brake means operatively engageable with associated vehicle ground engaging means to brake the speed thereof,
   brake actuating means operatively connected with said brake means and operative to selectively apply and remove said brake means to and from said ground engaging means, said governor means being provided with activating means operatively connected with said brake actuating means and operative thereon beyond the predetermined speed, said activating means having first position out of application with said brake actuating means below the predetermined speed and having a second position of application with the brake actuating means when the predetermined speed is exceeded whereby said brake actuating means applies said brake means to the ground engaging means, vehicle mounted conditioning means operatively connected with said brake actuating means and operative to allow said brake actuating means to be operative upon said brake means, and stationary ground mounted tripping means operatively positioned in the path of said conditioning means and operatively associated therewith and operative thereupon for activating and operating said conditioning means whereby, if said vehicle exceeds the predetermined speed, said brake actuating means is effective to brake the speed of the vehicle, and vehicle mounted resetting means operatively connecting with said governor means and said conditioning means when the vehicle speed is below the predetermined speed.

2. The invention according to claim 1, and
said speed sensing means including a driven belt means engageable with the ground engaging means and being provided with gearing for driving engagement with said governor means.

3. The invention according to claim 1, and
said brake means including a pneumatic brake system for applying pressurized fluid to an associated brake cylinder operatively connected with brake structure being engageable with said ground engaging means for braking the latter.

4. The invention according to claim 3, and
said brake actuating means comprising speed control valve means interposed in fluid obstructing position between said pressurized fluid of the brake system and the brake cylinder and having movable plunger means operatively associated with and movable by said activating means of said governor means in the second position of the activating means to allow fluid communication of the pressurized fluid with the brake cylinder.

5. The invention according to claim 4, and
said governor means having centrifugal force responsive means and said activating means having bleed valve means provided with a biased closed valve in the first position thereof engageable with said activating means whereby the biased plunger moves to the second position to permit communication of pressurized fluid with the brake cylinder.

6. The invention according to claim 1, and
said conditioning means comprising supply valve means, and
said resetting means comprising an arm on said governor means engaging said supply valve means when said activating means moves from the predetermined speed to a lesser speed.

7. The invention according to claim 1, and
manually operated means interposed between said brake means and said conditioning means and operative to block said conditioning means against operation in one position of the manually operated means and to place the conditioning means in operation upon manual manipulation of said manual means to a second position.

8. The invention according to claim 1, and
said brake actuating means comprising speed control valve means, and said conditioning means comprising supply valve means having a poppet and a two-way supply valve connected with said poppet whereby said tripping device operates said poppet to move said supply valve means from a closed position to an open position by supplying a momentary amount of pressurized fluid to one portion of said supply valve means to open said supply valve to allow pressurized fluid from a source to be available to the speed control valve means.

9. The invention according to claim 1, and
said activating means comprising abutment means moved by said governor means, said brake actuating means comprising speed control valve means, and said governor means comprising governor spindle means having centrifugal weights connected thereto which weights fly out upon increase in speed to urge the spindle means in one direction and move said abutment means to operate said valve means.

10. Apparatus for controlling the speed of a vehicle comprising:

vehicle mounted speed sensing means including ground driven means, governor means responsive to a predetermined maximum speed of the vehicle, said governor means connecting with associated ground driven means and operated thereby attendant to limiting a maximum predetermined speed of the vehicle, vehicle brake means operatively engageable with the vehicle ground engaging means to brake the speed thereof, brake actuating means operatively connected with said brake means and operative to selectively apply and remove said brake means to and from said ground engaging means, said governor means being provided with activating means operatively connected with said brake actuating means and operative thereon beyond the predetermined speed, said activating means having first position out of application with said brake actuating means below the predetermined speed and having a second position of application with the brake actuating means when the predetermined speed is exceeded whereby said brake actuating means applies said brake means to the ground engaging means, vehicle mounted conditioning means operatively connected with said brake actuating means and operative to allow said brake actuating means to be operative upon said brake means, and tripping means operatively positioned in the path of said conditioning means and operatively associated therewith and operative thereupon for activating and operating said conditioning means whereby, if said vehicle exceeds the predetermined speed, said brake actuating means is effective to brake the speed of the vehicle.

said brake means including a pneumatic brake system for applying pressurized fluid to an associated brake cylinder operatively connected with brake structure being engageable with said ground engaging means for braking the latter, said brake actuating means comprising speed control valve means interposed in fluid obstructing position between said pressurized fluid of the brake system and the brake cylinder and having movable plunger means operatively associated with and movable by said activating means of said governor means in the second position of the activating means to allow fluid communication of the pressurized fluid with the brake cylinder, and said conditioning means comprising an on-vehicle actuating supply valve having a plunger movable from a first closed position to a second open position to allow fluid communication with said speed control valve means.

11. The invention according to claim 10, and
said conditioning means having a poppet valve communicating with said supply valve and being movable to a supply position for allowing pressurized fluid to move said plunger to the second position, and
said tripping mechanism being mounted ahead of and off the vehicle and operable upon said poppet valve and moving same to the supply position.

12. Apparatus for controlling the speed of a vehicle comprising:
vehicle mounted speed sensing means including ground driven means,
governor means responsive to a predetermined maximum speed of the vehicle, said governor means connecting with associated ground driven means and operated thereby attendant to limiting a maximum predetermined speed of the vehicle,
vehicle brake means operatively engageable with the vehicle ground engaging means to brake the speed thereof,
brake actuating means operatively connected with said brake means and operative to selectively apply and remove said brake means to and from said ground engaging means,
said governor means being provided with activating means operatively connected with said brake actuating means and operative thereon beyond the predetermined speed,
said activating means having first position out of application with said brake actuating means below the predetermined speed and having a second position of application with the brake actuating means when the predetermined speed is exceeded whereby said brake actuating means applies said brake means to the ground engaging means,
vehicle mounted conditioning means operatively connected with said brake actuating means and operative to allow said brake actuating means to be operative upon said brake means,
tripping means operatively positioned in the path of said conditioning means and operatively associated therewith and operative thereupon for activating and operating said conditioning means whereby, if said vehicle exceeds the predetermined speed, said brake actuating means is effective to brake the speed of the vehicle, and
said brake actuating means comprising valve means and said activating means comprising abutment means movable in response to vehicle speed and engageable with said valve means for operating said brake actuating means.

13. Apparatus for controlling the speed of a vehicle comprising:
vehicle mounted speed sensing means including ground driven means,
governor means responsive to a predetermined maximum speed of the vehicle, said governor means connecting with associated ground driven means and operated thereby attendant to limiting a maximum predetermined speed of the vehicle,
vehicle brake means operatively engageable with the vehicle ground engaging means to brake the speed thereof,
brake actuating means operatively connected with said brake means and operative to selectively apply and remove said brake means to and from said ground engaging means,
said governor means being provided with activating means operatively connected with said brake actuating means and operative thereon beyond the predetermined speed,
said activating means having first position out of application with said brake actuating means below the predetermined speed and having a second position of application with the brake actuating means when the predetermined speed is exceeded whereby said brake actuating means applies said brake means to the ground engaging means,
vehicle mounted conditioning means operatively connected with said brake actuating means and operative to allow said brake actuating means to be operative upon said brake means,
tripping means operatively positioned in the path of said conditioning means and operatively associated therewith and operative thereupon for activating and operating said conditioning means whereby, if said vehicle exceeds the predetermined speed, said brake actuating means is effective to brake the speed of the vehicle,
said brake actuating means having speed control valve means and having a bleed valve exposed to atmosphere in response to the vehicle speed,
said speed control valve means having pilot means operatively associated with said bleed valve and operative thereby for urging said speed control valve means to a closed position,
biasing means urging said speed control valve means to an open position, and said pilot means being in communication with the bleed valve whereby said bleed valve reduces the pressure in the pilot means to allow said biasing means to place the speed control valve in the open position to allow pressurized fluid communication from a source of pressurized fluid to the brake means for operation thereof.

14. A speed control device for a railroad vehicle to control the wheel speed thereof comprising:
a wheel driven governor means responsive to the speed of the vehicle to effectuate braking of the vehicle's speed should the vehicle exceed a predetermined speed,
speed control means operatively connected with the governor means and operated thereby above the predetermined speed to brake the speed of the vehicle,
conditioning means operatively connected with said speed control means and effective to operate at speeds below and above the predetermined speed,
supply control means operatively connected with the speed control means for holding the speed control means in operative connection with the governor means in a speed range which is between a minimum vehicle speed below the said predetermined speed and a vehicle speed which is above the said predetermined speed,
said conditioning means operatively being connected with the supply control means and operative thereupon for operation of the supply control means at speeds above said minimum speed,
ground mounted tripping means momentarily engaging the conditioning means as the vehicle passes for operating the supply control means at speeds in excess of said minimum vehicle speed, and
vehicle wheel speed controlled resetting means operatively associated with the supply control means and operative below the predetermined speed to terminate operation of the supply control means at said minimum speed whereby the supply control means is inoperative until the conditioning means is again tripped by the off vehicle tripping means when the vehicle is moving above said minimum vehicle speed.

15. The combination of a speed controlled vehicle having a body, underframe and ground engaging means and a speed control arrangement for controlling the speed of the vehicle comprising:
speed control means mounted on said ground engaging means and comprising speed sensing means including ground driven governing drive means,
governing means responsive to a predetermined maximum speed of the ground engaging means, said governing means connecting with said ground driven means and operated thereby attendant to limiting a maximum predetermined speed of the vehicle, brake means mounted on said underframe and being operatively engageable with said ground engaging means to brake the speed of said ground engaging means, brake actuating means operatively connected with said brake means and operative to selectively apply and remove said brake means to and from said ground engaging means, said governing means being provided with activating means operatively connected with said brake actuating means and operative thereon beyond the predetermined speed, said activating means having first position out of contact with said brake actuating means below the predetermined speed and having a second position of contact with the brake actuating means when the predetermined speed is exceeded whereby said brake actuating means applies said brake means to the ground engaging means, vehicle mounted conditioning means operatively connected with said brake actuating means and operative to allow said brake actuating means to be operative upon said brake means, and stationary ground mounted tripping means being positioned in the path of said conditioning means and engageable therewith for activating and operating said conditioning means whereby, if said vehicle exceeds the predetermined speed, said brake actuating means is effective to brake the speed of the vehicle, and vehicle mounted resetting means operatively connecting with said governor means and said conditioning means for deactivating said conditioning means when the vehicle speed is below the predetermined speed.

16. A device for coupling of cars together in a train whereby the moving car to be coupled with a second car of a train has its speed controlled to reduce the amount of impact of the moving car with the second car, said device comprising:

an on moving car mounted speed control device, moving car mounted source of pneumatic pressure, said speed control device including governor means responsive to car speed and acceleration, speed control means being connectible to the source of pneumatic pressure on the moving car pneumatic brake means for supplying pressure to the car brake means for stopping of the moving car, said governor means responsive to change in vehicle speeds being provided with speed control activating means operatively associated with said speed control means and operative to introduced pneumatic pressure to said brake means upon exceeding of the moving car speed beyond a predetermined speed for reduction of the speed of the moving car below the predetermined speed, and moving car mounted supply control means for controlling the supply of pneumatic pressure to the speed control means at speeds above and below the predetermined speed, and stationary ground mounted trip means associated with said moving car and operative on said supply control means as the moving car passes by the trip means to permit supply of the pneumatic pressure from the speed control means to brake means at speeds above the predetermined speed, and moving car mounted resetting means operatively associated with the supply control means and operative thereupon at speeds below the predetermined speed to render the speed control means inoperative to supply pneumatic pressure to the brake means.

17. The invention according to claim 16, and said supply control means including a supply valve trippable by the trip means to supply pneumatic pressure to the speed control means beyond the predetermined speed.

18. A speed control device for a railroad car to control the wheel speed comprising:

a wheel driven means and a governor means driven by said wheel driven means, speed control valve means to supply pressurized fluid to the associated car brake cylinder for operating the car brake means comprising a speed control valve operatively connected with said governor means and opened thereby by a predetermined maximum speed for supplying pressurized fluid to the brake cylinder, conditioning means operatively connected with said speed control valve and having supply means associated with off-car mechanism selectively controlling the operation of the speed control valve in accordance with the movement of the car, and off-car mounted mechanism operatively engageable with said conditioning means to operate same and permit supply of pressurized fluid to said speed control valve and further means to shut off operation of the conditioning means.

19. The invention according to claim 18, and said supply means comprising a pneumatic pressure supply valve means being operatively connected with said speed control valve means and with said governor whereby said governor is operative upon said supply valve means in excess of said predetermined maximum speed for supplying pressurized fluid to the brake cylinder by way of the speed control valve means.

20. The invention according to claim 19, and poppet valve means communicating with said supply valve means operatively engageable with associated off-vehicle tripping means thereby and operative for operating said supply valve to conduct pressurized fluid to the speed control valve means upon exceeding said predetermined maximum speed.

21. The invention according to claim 19, and an isolating valve means being operatively connected with the speed control valve means for operatively supplying a pressurized fluid to the speed control valve means for supplying pressurized fluid to the brake cylinder and having means for selectively supplying and blocking flow of pressurized fluid to the brake cylinder by way of the speed control valve means.

22. The invention according to claim 21, and a main control valve means communicating with the isolating valve means and said last mentioned means of isolating valve means selectively communicating with main valve when blocking pressurized fluid flow to brake cylinder by way of speed control valve means.

23. A method for coupling of cars in a train within a loading yard comprising:

(1) sending a moving car toward a car in the yard, (2) conditioning the moving car by means of a stationary ground mounted trip in the path of the moving car and allowing an on-moving-car speed control means to control the speed of the moving car so as to not exceed a predetermined maximum speed when the speed control means is activated by the trip, (3) operating the tripped speed control means to limit movement of the moving car so that it does not exceed a predetermined maximum speed with application of the moving car brakes when such speed is exceeded and until the speed of the moving car is below the predetermined maximum speed, and (4) terminating operation of said moving car speed control means when the speed of the moving car is well below the predetermined speed so that the speed control means must again be actuated by the trip to again be operative.

24. A speed control device for a railroad car for limiting speed of the railroad car to a predetermined maximum speed comprising an on-car speed control means and an off-car tripping means for conditioning said speed control means for operation thereof, said speed control means comprising:
- means responsive to the speed of the car and adapted to be operatively connected with the car wheel means and operative by the rotation thereby and having speed control valve means,
- said means responsive to the car speed having movable means engageable with the speed control valve means for opening of said valve means to allow communication from a source of fluid pressure to the associated car brake means for application of the associated car brake means to reduce the speed of the car below the predetermined maximum speed,
- supply valve means having a normal closing position for blocking the supply of pressurized fluid from a source to the speed control valve means,
- said off-car tripping device including a stationary ground mounted trip means in the path of movement of said car, and
- said supply valve means being actuated and operated by engagement with said trip means to open the supply of pressurized fluid to the speed control valve means when the car reaches a predetermined position with respect to the trip means, and
- further means on the car to shut-off operation of the conditioning means.

25. A speed control for a railroad car to control the rolling speed of the car within predetermined limits comprising:
- a wheel driven means and a governor driven by said wheel driven means,
- speed control valve means to supply fluid under pressure to an associated car brake cylinder for operating the associated car brakes comprising a speed control valve operatively associated with said governor and opened thereby upon exceeding a predetermined maximum speed for supplying the fluid under pressure to the brake cylinder,
- conditioning means operatively connected with said speed control valve means and the governor and selectively controlling the operation of said valve means in accordance with the speed of the car, and
- stationary off-car ground mounted tripping mechanism being operatively associated with said conditioning means to operate same and to set the conditioning means for allowing a supply of pressurized fluid to said speed control valve means when required, and
- resetting means operatively connected with the governor means and the conditioning means and deactivating the operation of said conditioning means when the speed of the vehicle falls below a certain predetermined speed which is below the aforementioned predetermined speed.

26. The invention according to claim 25, and
- further means to terminate operation of said speed control valve means when said car is coupled to another car for trainline operation.

27. The invention according to claim 25, and
- said off-track mechanism momentarily operating said conditioning means to cooperate with said supply valve means in order to brake the speed of the car.

28. The invention according to claim 25, and
- means rendering speed control valve means inoperative during trainline operation.

29. The invention according to claim 25, and
- said tripping mechanism being a momentary actuating device as the car moves by a particular point and not operable over a period of time.

References Cited

UNITED STATES PATENTS

| | | | |
|---|---|---|---|
| 1,096,334 | 5/1914 | Watters | 303—21 |
| 1,608,185 | 11/1926 | Ruthven | 246—204 X |
| 1,695,880 | 12/1928 | Clifford | 246—190 |
| 2,336,135 | 12/1943 | Tangerman | 74—221 |
| 2,761,962 | 9/1956 | Hughson et al. | 246—182 X |
| 3,370,166 | 2/1968 | DaRold et al. | 246—182 |
| 3,385,964 | 5/1968 | Clejan et al. | 246—182 |

ARTHUR L. LA POINT, Primary Examiner

G. H. LIBMAN, Assistant Examiner

U.S. Cl. X.R.

303—21; 246—190

UNITED STATES PATENT OFFICE
CERTIFICATE OF CORRECTION

Patent No. 3,527,935　　　　　　　　　　　　　　　September 8, 1970

William H. Peterson

It is certified that error appears in the above identified patent and that said Letters Patent are hereby corrected as shown below:

Column 9, line 27, after "means" insert -- for deactivating said conditioning means --.

Signed and sealed this 6th day of April 1971.

(SEAL)
Attest:

EDWARD M. FLETCHER, JR.　　　　　　　　　WILLIAM E. SCHUYLER, JR.
Attesting Officer　　　　　　　　　　　　　Commissioner of Patents